United States Patent
Murday

[15] 3,647,141
[45] Mar. 7, 1972

[54] THRUST CONTROLLING APPARATUS

[72] Inventor: David A. Murday, Imperial Beach, Calif.
[73] Assignee: Rohr Corporation, Chula Vista, Calif.
[22] Filed: June 1, 1970
[21] Appl. No.: 41,831

[52] U.S. Cl..............239/265.29, 239/265.17, 239/265.39
[51] Int. Cl......................................................B64c 15/06
[58] Field of Search..............239/265.25, 265.27, 265.29,
239/265.39, 265.17; 60/228, 230

[56] References Cited

UNITED STATES PATENTS

| | | | |
|---|---|---|---|
| 3,266,734 | 8/1966 | Gahagan et al. | 239/265.29 |
| 3,558,058 | 1/1971 | Lennard | 239/265.29 X |
| 3,531,049 | 9/1970 | Hom | 239/265.39 X |
| 2,735,264 | 2/1956 | Jewett | 239/265.29 UX |

FOREIGN PATENTS OR APPLICATIONS

| | | | |
|---|---|---|---|
| 1,100,385 | 2/1961 | Germany | 239/265.25 |

OTHER PUBLICATIONS

Interavia, " The Viggen Thrust Reverser System," March, 1969, pp. 276– 277.

Primary Examiner—M. Henson Wood, Jr.
Assistant Examiner—Reinhold W. Thieme
Attorney—George E. Pearson

[57] ABSTRACT

Apparatus comprises elongate shroud surrounding jet engine. Aft portion of shroud extends rearwardly beyond stream. Passages through shroud wall aft of nozzle exit admit ambient air to define shroud aft portion as an ejector ring. A blocker door is provided for each passage and swings on lateral pivot from first forward position blocking forward portion of its passage, through intermediate positions partially blocking rearward flow of exhaust stream and redirecting portion of stream out through passages, to second full aft position where doors meet to block all rearward flow and redirect it out through passages. For supersonic flight afterburner operation, doors are bodily moved to fully block passages. Apparatus may be used with conventional jet or fan jet engines. Doors may be operated independently to modify the direction of the thrust vector.

12 Claims, 8 Drawing Figures

INVENTOR.
DAVID A. MURDAY

INVENTOR
DAVID A. MURDAY 3,647,141

THRUST CONTROLLING APPARATUS

BACKGROUND OF THE INVENTION

This invention lies in the field of gas turbine engines, commonly called jet engines, which produce reaction thrust by ejecting a high velocity stream of gas from the exhaust nozzle or tail pipe of the gas turbine. Airplanes equipped with jet engines have two problems on which a great deal of effort has been expended. One of these is that the exhaust gas stream creates a very high level of sound energy or "noise" in a wide range of frequencies and a portion of this noise reaches the ground at an energy level which is not acceptable to the public. The other problem is that jet airplanes have very high-landing speeds which place an excessive burden on the wheel brakes unless some retarding means is provided to assist in deceleration. In addition, the operation of military airplanes in steep dives or carrier landing approaches requires a high degree of speed braking in flight frequently followed by a need for immediate full power operation.

The invention is directed to apparatus which reduces the base drag and sound level by mixing free stream air with the gas stream and apparatus which reverses the direction of exhaust gas flow to produce counter thrust, and is more particularly directed to combined apparatus which performs both of these functions.

SUMMARY OF THE INVENTION

The present invention provides a very satisfactory solution to the general problem and offers a combination apparatus in which an injector ring induces the free airstream into a mixing zone with the exhaust gas stream and the injection inlet passages also serve as outlet passages for reverse thrust flow. A plurality of blocker doors cooperate with the passages to guide the inflow and are movable to positions to force the exhaust stream outwardly through the passages. There is a minimum total amount of apparatus and the actuating mechanism is very simple. The net result is minimum weight and maximum reliability compared to a translating sleeve-type reverser.

Generally stated, in generic form, the apparatus comprises an elongate streamlined shroud connected to and surrounding the engine and may be the airframe, nacelle or other portion of the airplane structure. The aft portion of the shroud extends rearwardly beyond the exit end of the nozzle to surround and control the exhaust gas stream. A plurality of airflow passages (three being best suited to a single-engine airplane) spaced around the periphery of the shroud aft of the exit end of the nozzle extend through the shroud wall from the exterior to the interior, avoiding the horizontal and vertical flight control surfaces, and the axes of the flow paths converge rearwardly for efficient flow and mixing. Their form also acts to direct the exhaust gas stream outwardly and forwardly to produce reverse thrust. Thus the aft portion of the shroud constitutes a dual purpose fixed ejector ring.

A blocker door is provided for each passage and is mounted on pivot means carried by the fixed ejector ring for swinging fore-and-aft about lateral axes. In their first, extreme forward position the doors block the forward portions of the passages and form part of the forward wall to guide the airflow inwardly around the turbine jet stream. They may be adjusted to various intermediate positions in which their trailing edges project inwardly toward the shroud axis, partially blocking the rearward flow of the exhaust stream and forcing portions of the stream outwardly through the passages to produce any desired degree of reverse thrust which is particularly valuable for military maneuvers. When the doors are swung to their second, extreme aft position, they meet at the axis of the shroud and completely block rearward flow through the ejector ring, redirecting the flow laterally outward and forward through the passages to produce reverse thrust.

In a modification, the doors are pivotally mounted on the free ends of pivoted arms which may be swung outward to bodily move the doors to positions in which they completely block the passages. This modification is used for afterburner operation when no ejector air is desired and the full area of the ejector ring is needed for the jet stream.

The apparatus is equally well suited for use with conventional jet or fan jet engines. The doors are normally operated in unison but they may be operated independently to modify the direction of the thrust vector and thus induce a pitching and/or yawing motion to the airplane.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
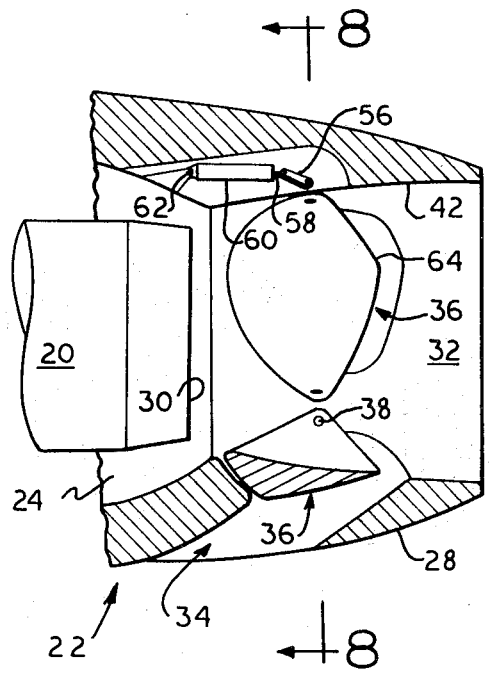
FIG. 1 is a schematic side view in section of a jet engine within a shroud incorporating the invention.

The general arrangement illustrated in FIG. 1 shows one preferred form of the invention embodied in the shroud 22 of a typical jet engine installation. A conventional turbojet engine shaft, not shown, has mounted on its forward end to a usual axial flow compressor, also not shown, and is provided at its aft end with a tail pipe or nozzle 20 for ejecting the jet stream of exhaust gases. The shroud 22 is provided to surround the components of the engine, and may be a portion of a fuselage or wing or other aircraft structure, but for simplicity is shown as having the form of a typical jet engine nacelle, which is generally annular in cross section and coaxial with the engine. The forward portion of the shroud extends forward to define between the shroud and nozzle 20 a passage 24 which may convey fan air or merely provide for static air insulation around the turbine and nozzle. Thus, the installation is a conventional turbojet engine type but is equally well adapted for use with a fan-type engine.

The aft portion 28 of the shroud extends rearwardly beyond the exit end 30 of the nozzle to define a mixing zone 32 for mixing turbine air with fan air, turbine air with cooling air, turbine air with atmospheric air induced through passages 34, or any combination of the aforesaid mixtures. A plurality of passages 34, preferably three, are formed through the wall of the shroud aft of the lateral plane of the exit end 30 of the nozzle and they are preferably equally spaced around the periphery to balance the thrust vector. They extend fully through the wall from the exterior to the interior and are angled inwardly and rearwardly to induce free stream air into the mixing zone 32 where it mixes with the air, if any, from passage 24 and the exhaust gas stream from nozzle 20. Thus, portion 28 of the shroud is an ejector ring. A blocker door 36 is provided for each passage 34 and is pivotally mounted at 38 for swinging about a lateral axis substantially perpendicular to the longitudinal axis of the shroud to modify air and gas flow in the manner hereafter described.

Figure 8:
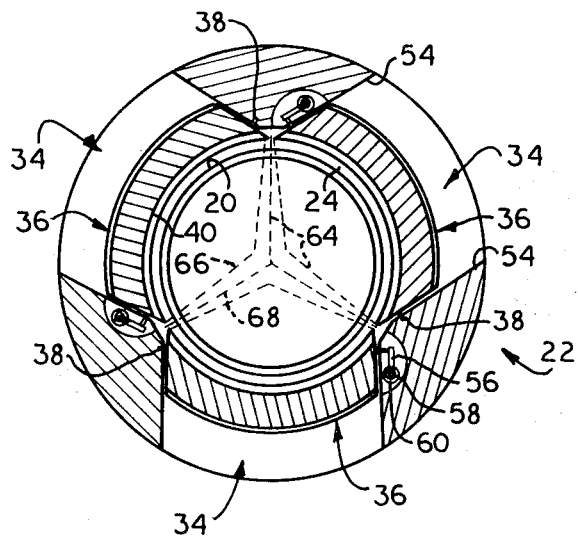
FIG. 8 is a sectional view taken along the line 8—8 of FIG. 1, the trailing edges of the blocker doors being shown in broken lines with the doors swung to their positions of FIG. 3 and FIG. 4, respectively.
Figure 2:
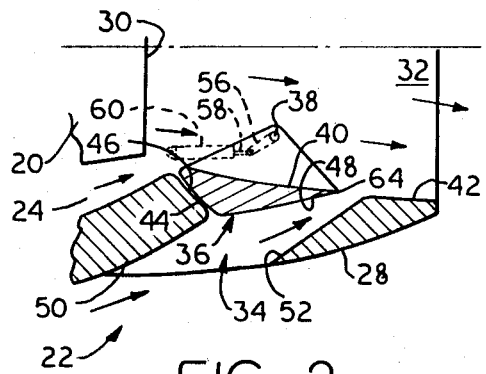
FIG. 2 is a schematic side view in section of part of the ejector ring portion of the shroud showing a blocker door in its first, extreme forward position.

The schematic illustration in FIG. 2 shows the lower rear portion of the shroud in greater detail than in FIG. 1 with a portion of the nozzle 20. FIG. 8, taken on line 8—8 of FIG. 1, shows the peripheral spacing of the passages and illustrates the action of the blocker doors. In FIG. 2, it will be seen that each door is generally airfoil shaped in fore-and-aft section and is arcuate in cross section so that its inner wall 40 forms a part of the contour of the inner wall 42 of the ejector ring 28.

In the first, extreme forward position of FIG. 2 the thick leading edge 44 of the door, the surface of which is preferably arcuate about pivot 38, contacts wall portion 46 of the passage in sealing relation. Thus the door blocks the forward portion of the passage. The upper rear surface 48 of the door cooperates with surfaces 50 and 52 of the passage to define an inwardly and rearwardly angled flow path for the free stream air to enter mixing zone 32 where it is mixed with the hot engine gases before leaving the ejector ring. Since the free stream air is cooler, the gaseous mixture is greatly cooled with reduced noise level. In addition, the tube of cooler air surrounding the hot gases further reduces the noise level on emission to free air.

Figure 3:
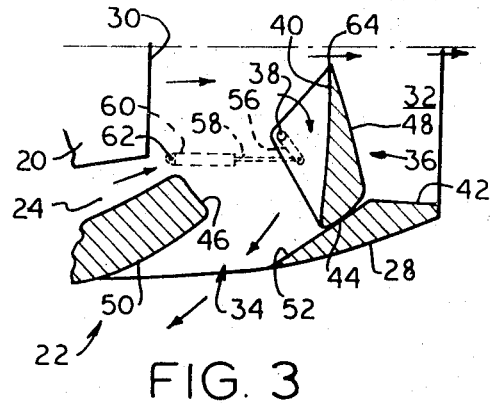
FIG. 3 is a view similar to FIG. 2 with the blocker door in intermediate position.

Turning to FIG. 8, it will be seen that each door is mounted on its pivot members 38 in the parallel sidewalls 54 of its respective passage 34. At least one of the pivot members for each door is provided with a lever arm 56 which, as seen in FIG. 2, is connected pivotally to a piston rod 58 slidably extending from the cylinder 60 of a servomotor, the cylinder being pivotally mounted to the shroud structure at 62. Operation of the servomotor in known manner will move the blocker door through intermediate positions, one of which is shown in FIG. 3, to the second, extreme aft position shown in FIG. 4. The trailing edge 64 of each door tapers rearwardly from the full width of the door to a point, so that the trailing edge margins of the doors may engage in sealing relation for full blocking of the rearward flow of the gas stream on occasion.

It is desired particularly in certain military maneuvers to be able to apply a high level of reverse thrust while maintaining engine operation at substantially full power. One example is a steep dive where the vertical velocity must not be excessive and yet full power must be almost instantly available for full thrust. Another example is a carrier landing where forward speed is greatly reduced but full thrust must be almost instantly available in case of a waveoff. For this purpose, the doors may be moved to a selected intermediate position, such as shown in FIG. 3. In this position, leading edge 44 of the door is in contact with surface 52, blocking ingress of free stream air to the mixing zone and providing a wide open flow path for outflow of exhaust gas and fan air, if present, to produce a high level of reverse thrust. As will be seen in FIG. 8, the trailing edges 64 of the doors are now in the broken line positions 66, leaving a Y-shaped passage for a portion of the jet outflow. With this adjustment the engine may be operated at a very high rotational speed and power level with no increase in back pressure while high level reverse thrust is being produced. When full thrust is demanded, the doors are returned to their first position without moving the throttle. Full thrust is achieved immediately.

Figure 4:
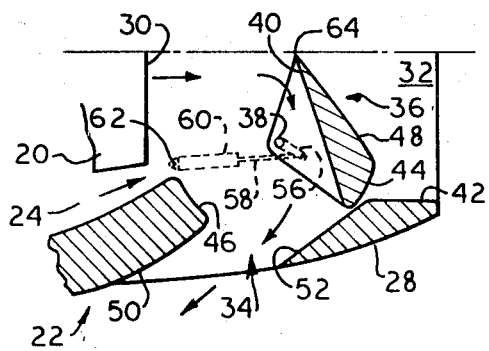
FIG. 4 is a view generally similar to FIG. 2, but showing the blocker door in its extreme aft, thrust reversing position.

When full reverse thrust is required, as for landing runs, the doors are swung to their second, extreme aft position shown in FIG. 4. The trailing edges of the doors engage along broken lines 68 to completely block rearward flow of the exhaust stream. As seen in FIG. 4, the doors now form a forwardly converging cone which provides a more effective flow coefficient in redirecting the flow of the gas stream.

Figure 5:
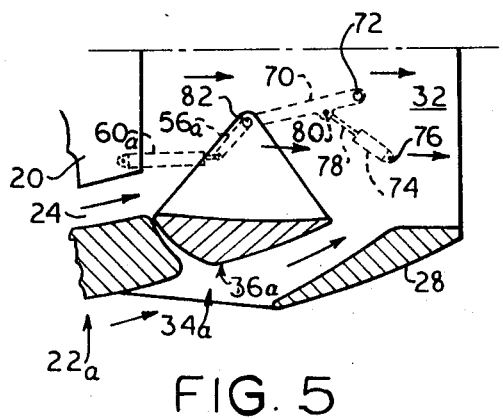
FIG. 5 is a view generally similar to FIG. 2, but showing a modified mounting arrangement for the blocker door.

The modification of FIG. 5 is generally similar to the showing of FIG. 2. However, in this modification an arm 70 is provided having its aft end pivotally mounted at 72, one one each side of each blocker door opening in the shroud 22a. A servomotor for actuating at least one of each pair of the arms 70 comprises a cylinder 74 pivotally connected at 76 to the shroud 22a, and a piston rod 78 pivotally connected at 80 to the arm 70. A blocker door 36a is pivotally mounted at 82 between the free ends of each pair of arms 70.

In FIG. 5, the door 36a is shown in substantially the same air ingesting position as that shown for the corresponding door 36 in FIG. 2.

Figure 6:
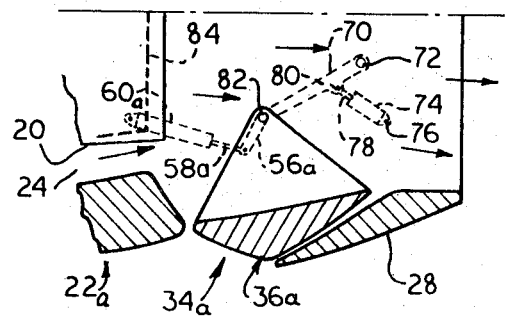
FIG. 6 is a view generally similar to FIG. 5, but showing the blocker door moved radially outwardly from the shroud axis to a position completely closing the air inlet passage.
Figure 7:
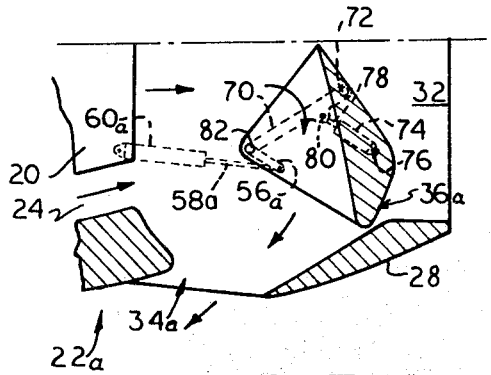
FIG. 7 is a view of the modified structure of FIGS. 5 and 6 with the blocker door swung to full-thrust reversing position.

When the engine of the embodiment shown in FIGS. 5 – 7 is to be operated in afterburning condition, the exhaust nozzle 20 is extended in a usual manner from its normal, broken line position 84 in FIG. 6, to its solid line position in that figure. Also, in order to seal off the air inlet passages 34a, and to provide maximum volume for the exhaust gases, the doors 36a are swung rearwardly slightly from their positions in FIG. 5 and the arms 70 are swung outwardly to their positions shown in FIG. 6, thereby moving the blocker doors 36a radially outwardly to close off the air inlet passages 34a.

The servomotors for swinging the doors 36a about their respective pivots 82 each comprises a piston rod 58a and cylinder 60a, and, when the arms 70 are swung to their axially inward position relative to the shroud 22a, are operated in the same manner as the cylinder 60 and piston rod 58 shown in FIGS. 1 – 4 and 8.

FIG. 7 shows the door 36a in its full blocking or thrust reversing position, which corresponds to the showing in FIG. 4.

The servomotors for actuating the blocker doors are normally operated in unison as described previously herein. However, they may also be actuated individually if desired to modify the direction of the thrust vector for inducing a pitch or yaw effect. The control and power supply means are not shown in detail since they are matters of design within the state of the art.

It will be apparent that the invention disclosed herein provides apparatus which provides thrust reversal which may be modulated to any desired degree with a minimum of weight and complication because of the dual functioning of most of its components, and in addition decreases the sound level of jet engine noise and reduces its own increase in base drag through induced tertiary air.

What is claimed as new and useful and desired to be secured by U.S. Letters Patent is:

1. Thrust controlling apparatus for use in combination with a jet engine having a rearwardly discharging nozzle and adapted to produce reaction thrust, comprising: an elongate shroud of generally annular cross section connected to and surrounding said engine, the aft portion of said shroud extending rearwardly beyond the exit end of said nozzle to surround and control the exhaust gas stream issuing therefrom; a plurality of peripherally spaced passages extending through the wall of said aft portion from the exterior to the interior thereof and aft of the plane of the exit end of said nozzle for inflow of ambient air to mix with the exhaust gas stream and make said aft portion an ejector ring; and a blocker door for each passage pivotally mounted to the ejector ring for fore-and-aft swinging about an axis perpendicular to the longitudinal axis of the shroud; said doors each being pivotally movable between a first extreme forward position blocking the forward portion of its respective passage and directing ambient airflow inwardly and rearwardly through the aft portion of said passages, through intermediate positions partially blocking rearward flow of the exhaust stream and redirecting a portion of it laterally outward through said passages to a second extreme rearward position cooperating with each other to substantially completely block rearward flow of the exhaust stream and redirect it laterally outward through said passages with increased effective flow coefficient.

2. Apparatus as claimed in claim 1; the wall of said shroud being spaced radially outward from the wall of the nozzle to define a path for air to flow rearwardly into the mixing zone defined by said ejector ring.

3. Apparatus as claimed in claim 1 each door having an airfoil shape in fore-and-aft section and arcuate in cross section; the thickened leading edge portion contacting the forward wall of the passage when the door is in its first position and the inner surface of the door being shaped to define a portion of the contour of the inner wall of the ejector ring.

4. Apparatus as claimed in claim 3; the thickened leading edge portion contacting the rear wall of the passage in at least one intermediate position to block inflow of ambient air to the interior of the ejector ring.

5. Apparatus as claimed in claim 1; the number of passages and doors being at least three; the trailing edge of each door tapering rearward from the full width of the door to a point; the included angle being chosen to cause the trailing edges to engage in substantially complete sealing relation in the second full blocking position.

6. Apparatus as claimed in claim 5; the pivotal mountings of the doors being so located that in the full blocking position the inner surfaces of the doors form a forwardly convex cone to initially guide the exhaust stream into a reverse flow path and hence prevent back pressuring the engine.

7. Apparatus as claimed in claim 1; the flow path axis of each passage being angled inwardly and rearwardly for efficient ejector inflow and for directing reverse thrust gas flow laterally outward and forward.

8. Apparatus as claimed in claim 1; said doors being operable independently of each other each about a separate and distinct pivot axis to modify the direction of the thrust vector.

9. Apparatus as claimed in claim 1; each door being movable generally radially outward to a position totally blocking its respective passage to prevent flow therethrough in either direction during afterburner operation of the engine.

10. Apparatus as claimed in claim 9; including generally fore-and-aft extending supporting arms for each door; said arms being pivotally mounted at their aft ends to the ejector ring for swinging about lateral axes; said doors being pivotally mounted to the fore ends of said arms for swinging about lateral axes; and the fore ends of said arms being swingable away from the axis of the shroud to carry said doors into total passage blocking positions.

11. Thrust controlling and ejector mechanism for use in combination with a jet engine having an exhaust nozzle for discharging rearwardly an exhaust gas stream adapted to produce reaction thrust, said mechanism comprising: a shroud of generally annular cross section surrounding said engine, said shroud extending rearwardly beyond the exit end of the nozzle to surround such exhaust gas stream, a plurality of circumferentially spaced door mounting injector passages extending through the wall of said shroud and terminating aft of said nozzle, and a blocker door mounted in each door passage to swing bodily about an axis perpendicular to the shroud axis and offset inwardly of the shroud from its respective door for fore-and-aft swinging movement of each door about its axis between an extreme forwardly swung position wherein it blocks the forward portion of its respective passage with its axially outward surface sloping rearwardly and inwardly to direct ambient airflow inwardly and rearwardly through said passages, an intermediate, partially rearwardly swung position wherein it opens its respective passage ahead of the door thereby partially blocking rearward flow of such exhaust gas stream through the shroud and directs a portion of such stream radially outwardly through said passages ahead of the doors for partial thrust reversal effect, and an extreme, rearwardly swung position, thereby retaining open the passages ahead of the doors, blocking rearward flow of such exhaust stream, and directing such stream laterally outward through said passages with a forward component for maximum thrust reversal effect.

12. Thrust controlling and ejector mechanism as defined in claim 11 wherein the axis about which each door swings is movable toward and away from the shroud axis for movement of the doors outwardly to passage closing condition in an intermediately swung position about their respective axes.

* * * * *